United States Patent [19]

Justice et al.

[11] Patent Number: 5,074,635
[45] Date of Patent: Dec. 24, 1991

[54] SPLICE TRAY AND METHOD

[75] Inventors: Barbara L. Justice; Wesley A. Raider, both of St. Paul, Minn.

[73] Assignee: Minnesota Mining and Manufacturing Company, St. Paul, Minn.

[21] Appl. No.: 525,608

[22] Filed: May 21, 1990

[51] Int. Cl.[5] .............................................. G02B 6/36
[52] U.S. Cl. ...................................... 385/95; 385/135
[58] Field of Search ................ 350/96.20, 96.21, 96.22

[56] References Cited

U.S. PATENT DOCUMENTS

| | | | |
|---|---|---|---|
| 4,679,896 | 7/1987 | Krafcik et al. | 350/96.20 |
| 4,687,289 | 8/1987 | De Santi | 350/96.20 |
| 4,702,551 | 10/1987 | Coulombe | 350/96.20 |
| 4,911,521 | 3/1990 | Ryuto et al. | 350/96.20 |
| 4,932,744 | 6/1990 | Messelhi | 350/96.20 |
| 4,989,830 | 12/1984 | Charlebois et al. | 206/316 |

FOREIGN PATENT DOCUMENTS

| | | |
|---|---|---|
| 0331402A1 | 9/1989 | European Pat. Off. . |
| 0331479A1 | 9/1989 | European Pat. Off. . |
| 2564989 | 11/1985 | France ............................. 350/96.20 |

OTHER PUBLICATIONS

Raychem System Practice-FOSC 100 Fiber Optic Splice Closure System, Raychem Corp., Issue 2, 6/87, pp. 2.1, 7.1, 7.2, 8.1, 12.1.
Brochure, FOSC 100 Fiber-Optic Splice Closure System, Raychem Corp.
Brochure, FOSC 100B Fiber Optic Splice Closure System, Raychem Corp., 9/89.

*Primary Examiner*—William L. Sikes
*Assistant Examiner*—Phan T. Heartney
*Attorney, Agent, or Firm*—Gary L. Griswold; Walter N. Kirn; John C. Barnes

[57] ABSTRACT

A splice organizing tray can protect the optical fibers from excessive stress if the fibers stored in the tray are organized in paths which do not require bending of the fibers beyond their approved bend radius, which do not require the fibers to cross, and which maintain the fibers in contact with the support substantially all the time. The tray has a convex bottom wall to urge the fibers against the edges of the tray, a recessed splice support area, and resilient snaps to engage the ends of the splices to permit the splices to be placed closer together. Holes below the splices afford the removal of the splices without danger to the adjacent fibers.

17 Claims, 4 Drawing Sheets

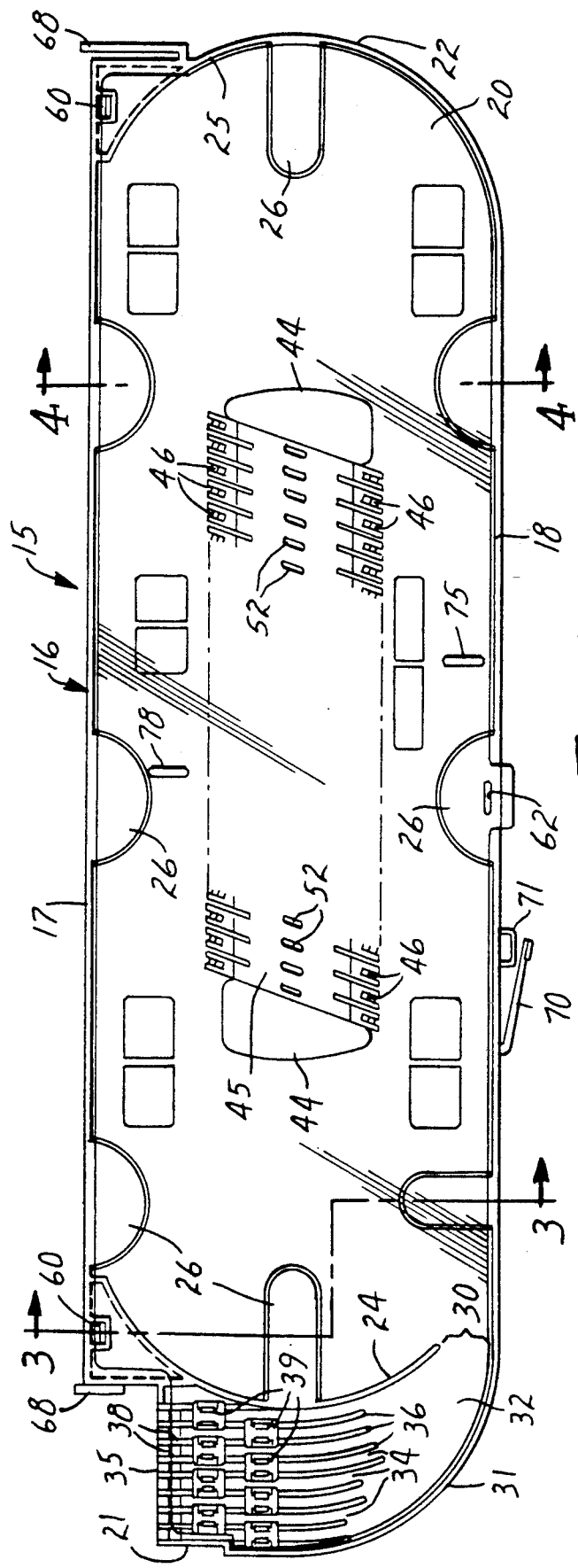
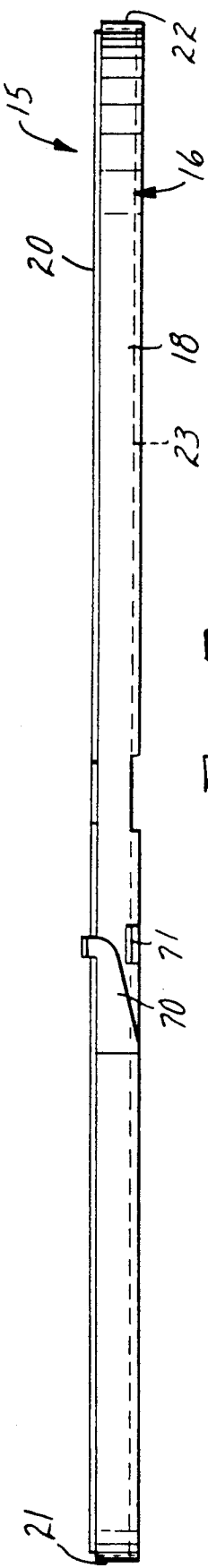
FIG. 1
FIG. 7

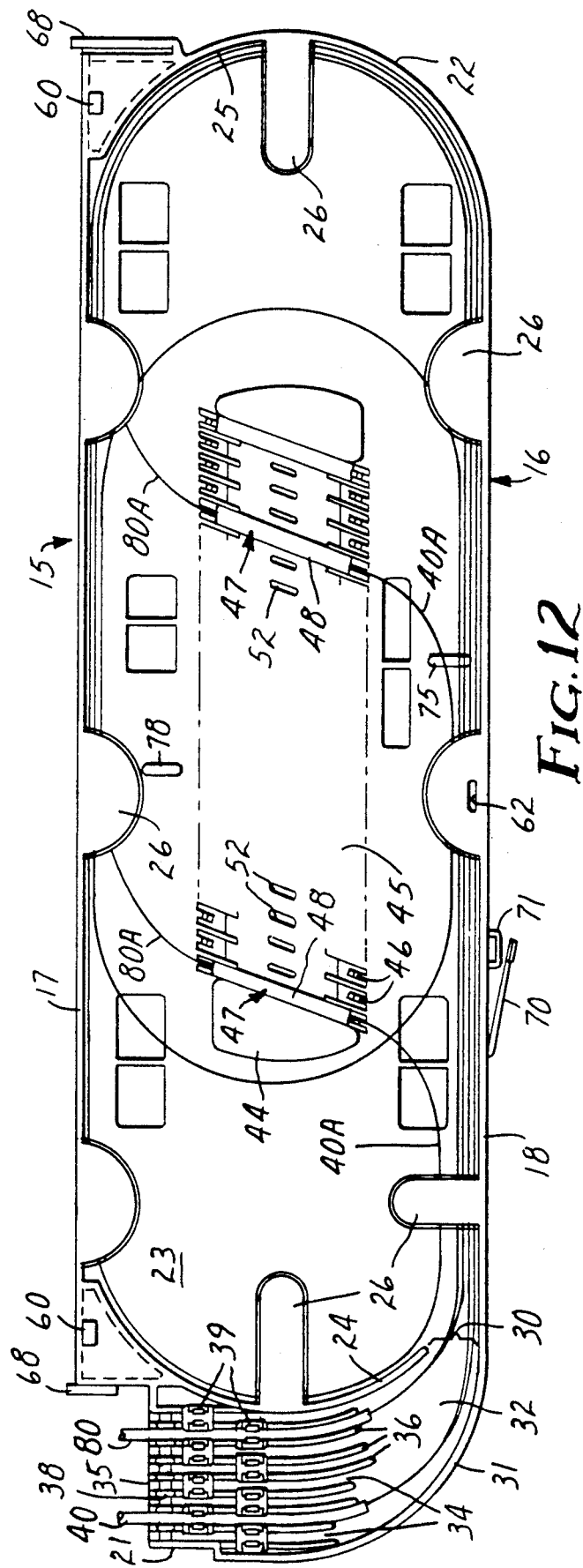

SPLICE TRAY AND METHOD

BACKGROUND OF THE INVENTION

1. Field of the Invention

The present invention relates to splice trays and slack optical fiber organizing trays, and more particularly to an improved organizer tray for spliced optical fibers and the splicing elements, affording safe, efficient handling of the individual fibers when splicing the multiple fibers from buffer tubes.

2. Description of the Prior Art

A typical buffer tube encases from six to twelve optical fibers. The buffer tube is removed from one end to expose from one to four meters of the fibers. The ends of the optical fibers are spliced to the ends of fibers in another buffer tube of another cable or to the pigtail fibers of other optical fiber devices, couplers, connectors, attenuators, switches etc.

The trays for storing the optical fiber splices and the slack fiber, that is optimally provided to permit repair and replacement of a splice, has been an area of inventive endeavor for some time now and the literature is replete with disclosures of various types and styles of fiber storage trays and assemblies to store optical fiber and splices. Each marketable tray must have adequate size to allow storage of slack optical fiber in a loop at least twice the minimum prescribed bend radius of the optical fiber. Also, an area is provided to maintain the splice in a suitable fixed position to restrict movement which could readily fracture the fiber near the end of the splice. Still there is need to have access to the fibers and splices occasionally and tray assemblies should make the splices and slack fiber accessible. Storage trays are utilized in closures where cables having a plurality of buffer tubes are spliced. They are also used in closures where a cable is opened and one or more buffer tubes are spliced into a branch line. The trays also appear in distribution panels where optical fiber cables are terminated and distribution fibers are directed throughout a network.

The known trays however are not user and fiber oriented such that the fibers are safely stored and readily accessible without danger of damaging adjacent fibers or groups of fibers in an adjacent tray assembly. They do not afford separation of the terminated fibers in a buffer tube. They do not allow easy removal of the splice without danger to the fibers at the ends of the splices.

The tray of the present invention affords rapid fiber orientation, easy access to the fibers to locate desired fibers by color or number and restrict the possibility of damaging adjacent fibers. It accommodates up to 24 optical fiber splices and the respective fibers. The tray has eight channels at one end which accept eight buffer tubes, and the tubes are retained by their snug fit into channel retention snaps and below lips on the top of the channels and other buffer ties or clamps are not needed. These and other unique features will be described below.

SUMMARY OF THE INVENTION

The present invention provides a splice tray for use in storing the splices and slack fiber associated with splicing the ends of a plurality of optical fibers from at least a first and a second buffer tube, each of which includes a plurality of said optical fibers. The novel tray comprises an elongate molded base or casing having two generally parallel spaced side walls, first and second end walls, and a bottom wall. The end walls include arcuate inner wall surfaces and the side walls and the end wall surfaces have free edges defining the top or open side of the casing at generally a common plane. Formed about the perimeter of the open side are fiber retaining lips projecting inwardly therefrom and spaced from said bottom wall for receiving and retaining lengths of optical fibers positioned along said side walls and end wall surfaces. A splice receiving portion is disposed generally centrally of the bottom wall of the casing and comprises a plurality of side by side recessed areas or channels, each having an axis parallel to the axis of an adjacent channel, for receiving splices joining the ends of two abutting optical fibers. The channels are disposed with their axes at an acute angle to the side walls.

The first end wall surface of the casing has an opening adjacent to one of said side walls and the opening communicates with an extended portion of said first end wall which has an arcuate surface opposite the first end wall surface and a second spaced arcuate inner wall surface communicating with the side wall affording smooth stress free entry of the fibers of the buffer tubes into the casing.

Further, the tray has a tapered or convex bottom wall affording increased fiber storage around the tray perimeter, below the level at which the fibers exit the splices while maintaining support for the fibers going into and out of the splice.

The splice receiving recess is formed integrally with the casing and side-by side areas or channels have an end wall formed as a snap for resiliently retaining a splice within the individual channel by engaging the splice at the end. Each channel is also provided with an opening in the bottom of the channel for allowing access for a tool to remove a splice from a channel.

Additionally, the splice tray entry area for the buffer tubes has adjacent thereto resilient retaining means for receiving and resiliently retaining buffer tubes in said edge wall and channels which are radiused to direct fibers into and out of the storage area of the casing.

The splice tray, in a further embodiment comprises a cover pivotally connected to the casing along a side wall to cover the open side of the casing. The casing and cover are provided with means cooperating with each other to permit stacking of said splice trays and hinge-like movement between the trays in a stack.

The present invention further includes a novel method of handling and storing spliced ends of optical fibers between a pair of buffer tubes encasing a plurality of optical fibers. The method includes the steps of stripping an end of the buffer tube to expose a length of the optical fibers, placing the remaining end of the buffer tube in one end of a tray and snapping the same in place to retain the remaining end of the buffer tube in the casing, extending the optical fibers along the side and end walls of the tray to wrap approximately one wrap of slack fiber of each optical fiber within the tray, directing the optical fibers past the midpoint of one side wall of the tray, cutting the fibers from the buffer tube at a predetermined point to make the exposed optical fibers the same length. The same steps are repeated for the other buffer tube to be spliced. Placing the ends to be spliced in a splice and placing the splices in a side-by-side relationship along the length of the tray, whereby the loops of the fibers will be spaced progressively at different distances from one end wall of the tray. The splices are snapped into channels sufficiently for resilient retainers to engage an end of the splice to hold the same in fixed relationship in the tray.

BRIEF DESCRIPTION OF THE DRAWINGS

The present invention will be further described hereinafter with reference to the accompanying drawing wherein:

FIG. 1 is a top plan view of a tray constructed according to the present invention;

FIG. 5 is a cross sectional view taken along the axis on splice retaining channel in the casing and illustrating a splice and optical fiber in the splice;

FIG. 7 is a front view of the tray;

FIG. 12 is a diagrammatic plan view of the casing of the tray illustrating the method of splicing, storing and organizing optical fibers in a tray according to the present invention.

DESCRIPTION OF THE PRESENTLY PREFERRED EMBODIMENTS

Figures 2, 3, 4, 6:
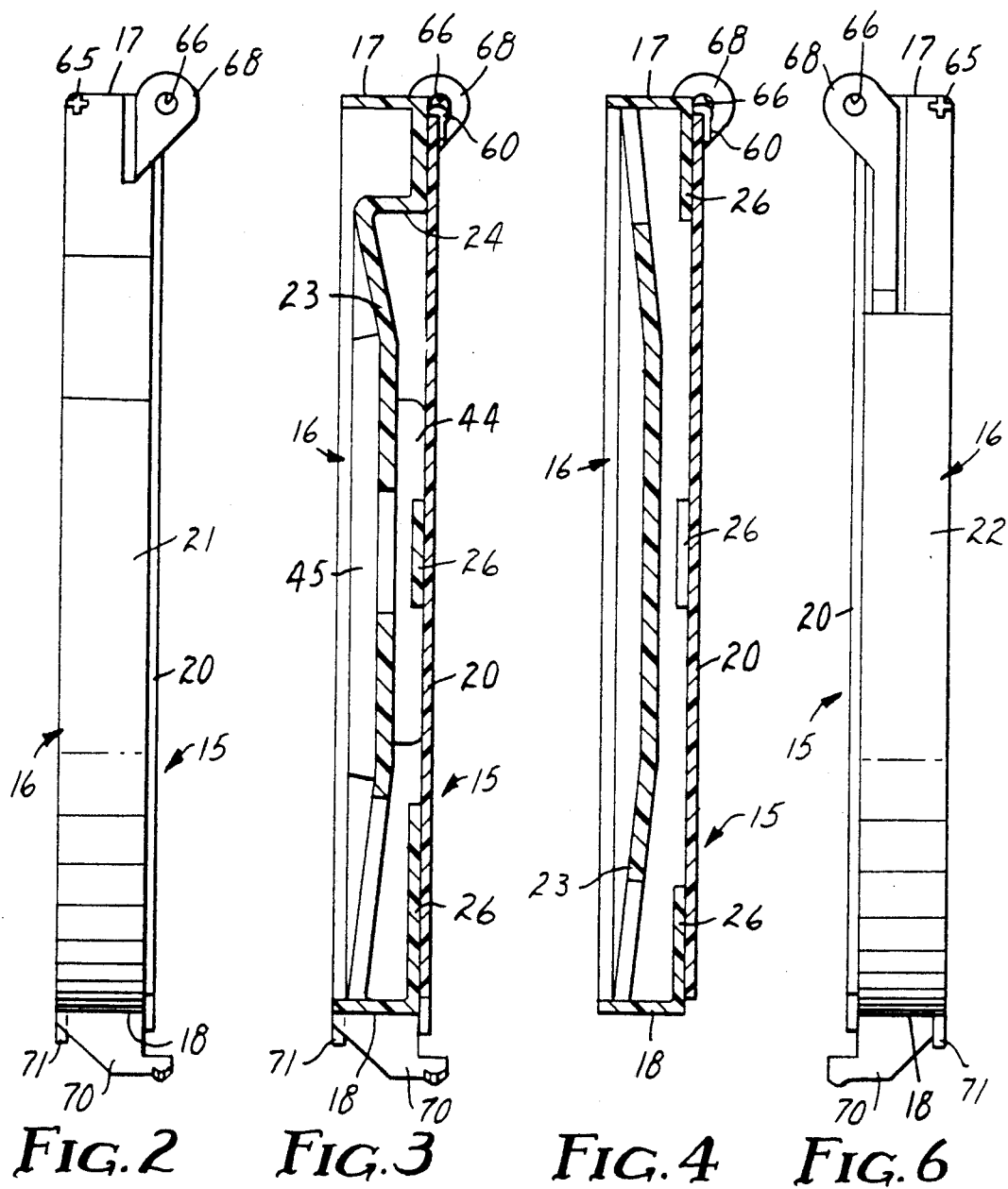
FIG. 2 is an end view of the left end of FIG. 1.
FIG. 3 is a transverse sectional view of the tray of FIG. 1 taken along the line 3—3 of FIG. 1.
FIG. 4 is a transverse sectional view taken along the line 4—4 of FIG. 1.
FIG. 6 is an end view of the right end of the tray according to the present invention.

The optical fiber splice organizer tray of the present invention will now be described in greater detail with reference to the accompanying drawing wherein like reference numerals refer to like parts throughout the several views. The splice tray 15 comprises a base or casing 16 and a cover 20. In one embodiment the casing is approximately 15.5 inches (39.4 cm) long, 4.25 inches (10.8 cm) wide and 0.41 inch (10.4 mm) in height. Each tray can accommodate up to 24 splices, and stores the respective slack fiber with maximum organization in a minimum amount of space without violating a minimum bend radius of 2 inches (5.08 cm) for the normal fibers and can handle up to 8 buffer tubes.

The casing 16 is preferably a single integrally molded structure and comprises two generally parallel spaced side walls 17 and 18, first 21 and second 22 end walls, and a bottom wall 23. The side walls 17 and 18 have inner generally parallel fiber directing surfaces and the end walls 21 and 22 include arcuate inner wall surfaces 24 and 25. The side and end walls have free edges opposite the bottom wall 23, defining generally a plane at the upper open side of the casing. About the periphery of the open side, as illustrated, are formed eight optical fiber retaining lips 26 which extend into the area defined by the inner surfaces of the side and end walls, and are spaced from the bottom wall, for retaining the fibers between the lips 26 and the bottom wall 23. The bottom wall 23 is provided with an opening opposite each of the retaining lips 26 for purposes of molding only. Otherwise the bottom wall is substantially continuous, but is formed with tapered surfaces that drop from the central area towards the side and end walls to make the casing deeper about the perimeter of the inside surface. This allows for increased fiber storage. The bottom wall 23 thus has a convex surface for urging the optical fibers placed about the side and end walls to migrate or fall toward the sides or perimeter. The bottom wall 23 is also formed with a recessed parallelogram shaped central area 45 for receiving and storing the splices, to be described later. This convex structure increases support for the fibers at the splice storage area.

Figure 9:
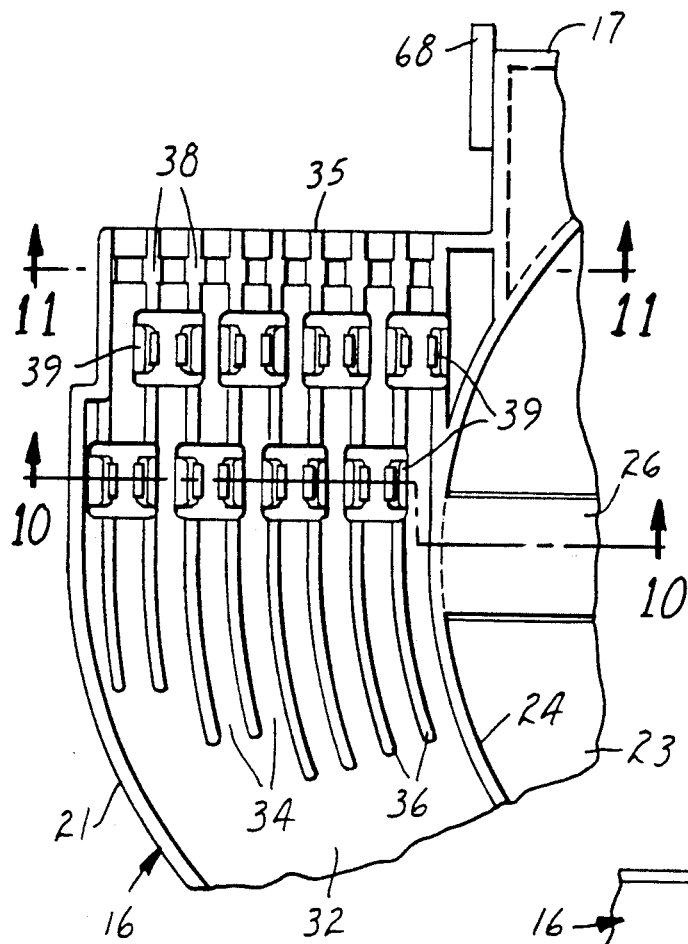
FIG. 9 is an enlarged detail plan view of the entry area of the casing.
Figure 8:
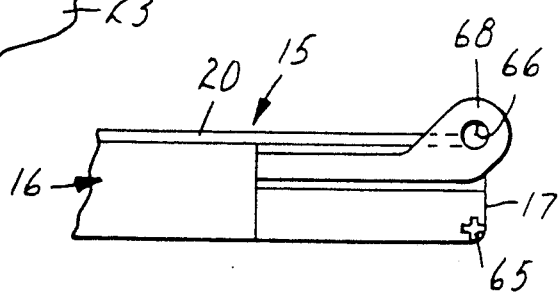
FIG. 8 is an enlarged fragmentary right end view of tray illustrating the hinge members.
Figure 10:
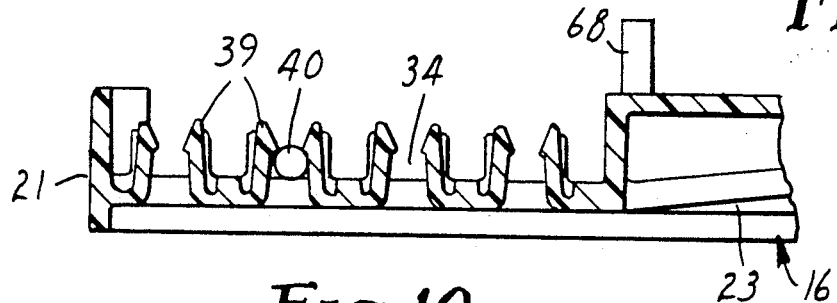
FIG. 10 is a sectional view of the entry area of FIG. 9 taken along the line 10—10.
Figure 11:
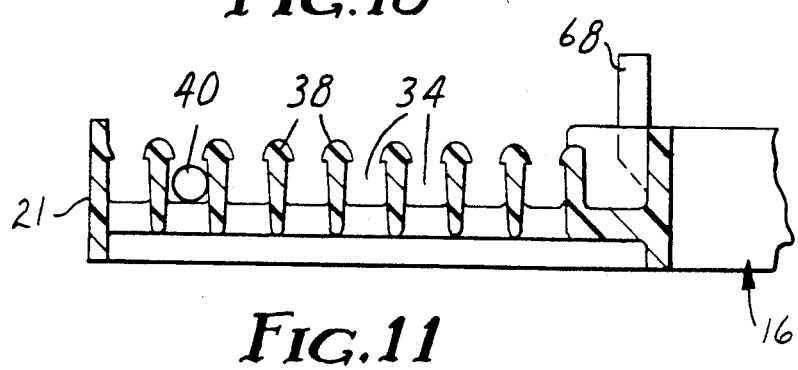
FIG. 11 is a sectional view of the entry area of FIG. 9 taken along the line 11—11.

At the first end wall inner surface 24 is an opening 30, formed adjacent the side wall 18 through which optical fibers are introduced and exit the casing. The end wall 21 also includes an extended area leading to an arcuate outer wall 31, spaced from the inner wall surface 24, affording a lead-in to the opening 30. The extended area has a bottom wall 32 disposed at the level of the bottom wall 23 at inner wall surfaces of the side walls 17 and 18 and has a plurality of side-by-side buffer tube receiving channels 34 disposed therein. The channels extend from a first edge 35 of the extended area along the path of the wall 31 and are defined by raised arcuate spaced ribs 36, see FIG. 9. Adjacent the edge 35, see FIGS. 9 and 11, and forming retaining means for the buffer tubes are headed pins 38 which are flexible sufficiently to receive a buffer tube 40 therebetween and the heads serve to restrict the buffer tube from movement out of the channel. Further, and spaced from the edge 35 are buffer tube retention snaps 39, one for each channel 34 which grasp and hold the sides of the buffer tubes 40, see FIG. 10. The headed pins and the retention snaps serve to form means in each of the channels for retaining the buffer tubes in the channels and effectively affording strain relief on the buffer tubes to restrict pull-out of the buffer tubes. Buffer tubes with an outer diameter of approximately 0.118 inch (3 mm) fit easily into the channels and snap into the retention snaps 39 and below the channel lips 38. The buffer tubes are retained without needing any extra tools or parts and the amount of pressure on the buffer tubes of fibers is controlled eliminating the possibility of inducing transmission losses due to over stressing of the fibers.

The central area of the casing 16 is provided with means for retaining splices in the casing which splices are used to join the ends of the fibers in end to end abutting relationship. The splice tray illustrated is formed specifically to retain a splice corresponding to the splice described and claimed in U.S. Pat. No. 4,818,055, the disclosure of which is incorporated herein by reference. As illustrated in FIGS. 1 and 5, the splice retention means comprises a central recessed area 45, positioned between two upstanding posts 44 which support the cover 20. The recess 45 has a parallelogram shape with the longitudinal edges generally parallel to the side walls 17 and 18. The ends are disposed at about 70 degrees to the side walls 17 and 18. Along the edges of the area 45 are a plurality of opposed resilient retaining members or snaps 46. The snaps are best illustrated in FIG. 5 wherein a section is made oblique to the casing longitudinal axis and through an optical fiber splice 47 of the type described in U.S. Pat. No. 4,818,055. The snaps 46 are molded integrally with the casing and comprise finger-like members which extend upwardly and inwardly from the edges so the ends can be flexed toward the end of the splice 47. The free ends of the fingers 46 do not extend above the top surface of bottom wall 23 to restrict interference with the fibers during the positioning of the fibers. The fingers are spaced along the edge and cooperate with a similar finger along the opposite edge to receive and retain the opposite ends of a splice 47 as illustrated. The splice 47 comprises a base 48, fiber aligning element 49, end inserts 50 and a cap or cover 51 which serves to hold the ends of fibers 40A and 80A in abutting relationship. The end inserts 50 of the splice are recessed within the base of the splice and the recesses at the ends of the splice 47 cooperate with the snaps 46 to receive the finger members placed against the ends of the splice 47 to hold the splice in place. In the bottom of the recessed area 45 and between each pair of snaps 46 is an opening 52 which allows insertion of a tool against the cover 51 of the splice 47 to dislodge the splice from the snaps 46. In the tray 15, the splice is disposed oblique to the side walls 17 and 18 of the casing 16 and the bending radius is reduced when the fiber splice is positioned in the splice retaining area.

When a regular screw driver head is inserted into the slot and pushed upwards against the splice cap, the splice pops straight up and out of the retention snaps 46 in such a manner that no other splice is touched or affected and the fibers from the splice are not bent such that loss may be induced. This construction controls where pressure is applied to the splice to remove the splice from the tray. This differs from other trays where it is necessary to enter the tray from the top to remove the splice from a channel grasping opposite sides of the splice.

The optical fibers in the splice are also positioned adjacent or touching the bottom wall 23 of the casing 16 when positioned in the recess 45 to limit the bending of the fiber adjacent to the ends of the splice. External forces applied to the casing or tray 15, when moving the tray in relationship to adjacent trays, do not have as great a tendency to swing the fibers about the ends of the splice when supported on the surface of bottom wall 23, which swinging motion can cause stress on the fibers at the end of the splice. Therefore, the recess coupled with the rotation of the fiber splice to place the top of the splice in the bottom of the recess, provide support for the fibers and the easy removal of the splice by pressing a tool against the flat top surface of the cap 51 of the splice.

The casing 16 is provided with cover retention snaps or hinge members 60 on the free edge of the side wall 17, and the cover is provided with an opening spaced from an edge of the cover 20 to form a bar which is designed to fit under the hinge members 60 to provide the pivot axis for the cover. On the opposite side of the cover is a projection which fits into a slot 62 formed in a retention lip 26 along the side wall 18. The projection and slot 62 provide a latch for the cover 20 to the casing 16.

A plurality of trays 15 can be stacked one above the other to provide a plurality of trays in a storage unit. To this end, each casing 16 is provided with a stud 65 projecting from the end wall 21 and 22, which studs are of a size and shape to be received in openings 66 formed in ears 68. Therefore, one tray 15 can pivot in relationship to a lower tray to afford access to the lower tray. To hold the trays in a stack, the front edge of the trays are provided with a resilient snap latch 70 which projects forwardly normally from the side wall 18 and has a pawl which projects above the surface of the generally planar free edge of the side and end walls and the cover. Also positioned on the side wall 18, along the lower edge, in the path of the latch is a detent 71 to receive the pawl of the latch of a lower tray to restrict the pivoting of the trays in relationship to one another.

In the illustrated form of the invention the tray can receive eight buffer tubes at one end and splice the associated fiber. The method for using the tray to its greatest advantage in splicing the fibers from the buffer tubes is hereafter described. The buffer tubes of optical fibers to be spliced are chosen. Depending on the application, a group of buffer tubes of fibers (two or more) may be spliced to one buffer tube of fibers, for example, two 6 fiber buffer tubes of fibers may be spliced to one 12 fiber buffer tube of fibers. The buffer tubes are trimmed by cutting the end of the buffered tubes without cutting the fibers to allow approximately one to two meters of the fibers to be exposed beyond the free end of the buffer tubes. The grease sealant is removed from the fibers and the end of the first buffer tube 40 is placed in a channel 34 at the one end of the casing. The fibers are then placed around the inner periphery of the casing and the ends are brought past a mark 75 on the bottom wall 23 adjacent the side wall 18, which mark 75 has indica adjacent to it which says "cut here". The fibers in the buffer tube 40 are all cut to the same length and then the fibers, not the end of the buffer tube, are removed from the casing. The second buffer tube 80, containing the optical fibers to which the first optical fibers are to be spliced, are similarly prepared. The free end of buffer tube 80 is placed into a channel 34 and is snapped into place. The fibers 80A are placed about the periphery of the casing and approximately two loops are made. The ends of the fibers are drawn past a second mark 78 which is similarly indicated as a "cut here" mark. The fibers of the second buffer tube are cut to the same length at the mark 78. These fibers are then removed from the casing. The ends of the fibers are then prepared for splicing. The free ends of selected optical fibers to be spliced are placed into opposite ends of a splice 47. The splices 47 and the fibers are then returned to the casing and the splices 47 are positioned to place the ends thereof, having the fiber ends therein, in a row along the side wall 18. The splices are then inverted to place the cover of each splice in the recess 45 with the ends between two opposed splice retaining snaps 46 and each splice is pressed into snapped locked position with a snap 46 against each end of the splice, as illustrated. The fibers at the ends of the splice are positioned adjacent the bottom wall 23 and the splice is mounted. As the fibers are spliced and the splices 47 are placed in the desired position in the splice tray 15, the fibers placed in splices positioned farther from an end wall surface causes the last loop of the fiber to progressively move away from the inner wall surface 24 or 25, as the case may be, and this provides a separation of the fibers such that the individual fibers can be located and separated from the other fibers spliced in the tray more easily.

The combination of features in the tray of this invention provides for all the fibers to enter the tray at one point, the splices are all located along the center of the tray, the fibers do not cross over each other during the splicing, and the cutting of the fibers entering one end of the splices to one length offers a unique ability to better organize the fibers than offered by other competitive trays.

The casing of the present invention can be formed with a splice holder in the central portion of the casing to accommodate splices different from the splice 47 illustrated. A mold can be formed to have a center section removed and replaced by a different section and a different splice receiving area can be incorporated in the casing. Other modification may also be made in the structure illustrated and not depart from the present invention as defined in the appended claims.

We claim:

1. A splice tray for use in storing the spliced ends of optical fibers from a first and a second buffer tue, each of which includes a plurality of said optical fibers, said tray comprising:

an elongate molded casing having two generally parallel spaced side walls, first and second end walls, and a bottom wall, said end walls including arcuate inner wall surfaces and said side walls and said end wall surfaces having free edges defining generally a plane formed with retaining means projecting inwardly therefrom and spaced from said bottom wall for receiving and retaining lengths of optical fibers positioned along said side walls and end wall surfaces;

a splice receiving portion disposed generally centrally of said bottom wall, said splice receiving portion comprising a plurality of side-by-side channels, each having an axis parallel to the axis of an adjacent channel, for receiving spliced joining the ends of two abutting optical fibers, said channels being disposed with their axes oblique to said side walls; and said first end wall surface having an opening therein adjacent to one of said side walls and communicating with an area extending beyond said first end wall which has an arcuate surface opposite said first end wall surface and a spaced arcuate inner wall surface communicating with an edge wall parallel to the second of said side walls affording entry of at least a pair of buffer tubes into said casing.

2. A splice tray according to claim 1 wherein said bottom wall is convex and has said splice receiving portion disposed in a central longitudinally extending portion which is nearer said plane of said free edges of said side and end walls than the outer peripheral edges of said bottom wall for urging slack from optical fibers to rest adjacent said edge walls and said end wall surfaces.

3. A splice tray according to claim 1 wherein said splice receiving channels are formed integrally with said casing and each channel comprises end wall means for resiliently retaining a said splice within said channel.

4. A splice tray according to claim 3 wherein said channel has an opening in the bottom of the channel for allowing access of a tool to remove a splice from a channel.

5. A splice tray according to claim 1 wherein said edge wall has adjacent thereto resilient retaining means for receiving and resiliently retaining buffer tubes in said edge wall directed into and out of said casing.

6. A splice tray according to claim 1 wherein said tray further comprises a cover pivotally connected to said casing along a said side wall to cover the side of the casing opposite said bottom wall.

7. A splice tray according to claim 6 wherein said cover and said bottom wall have means cooperating with each other the to permit stacking of said splice trays and hinge-like movement between the trays in a stack.

8. A splice tray according to claim 1 wherein said side-by-side splice receiving channels are formed integrally with said casing and each channel is recessed below the surface of said bottom wall sufficiently that the fiber entering the splice is supported on the bottom wall.

9. A splice tray according to claim 8, wherein said splice receiving portion further comprises resilient retaining means disposed at opposite ends of each channel for engaging the ends of a said fiber splice to retain the same in the channel.

10. A splice tray according to claim 1 wherein said bottom wall is formed with opening means affording access therethrough into said splice receiving channels for allowing a tool to be inserted through said bottom wall to remove the splice from the channel.

11. A splice tray according to claim 1 wherein said area extending beyond said first end wall is positioned between said first end wall and said arcuate surface opposite said first end wall surface and terminates at said edge wall which is parallel to said second side wall, for affording entry of said buffer tubes into said tray perpendicular to said side walls.

12. A splice tray for use in storing the spliced ends of optical fibers from a first and a second buffer tube, each of which includes a plurality of said optical fibers, said tray comprising:

an elongate molded casing having two generally parallel spaced side walls, first and second end walls, and a bottom wall, said end walls including arcuate inner wall surfaces and said side walls and said end wall surfaces having free edges defining generally a plane formed with retaining means projecting inwardly therefrom and spaced from said bottom wall for receiving and retaining lengths of optical fibers positioned along said side walls and end wall surfaces; and a splice receiving portion disposed generally centrally of said bottom wall and recessed in the bottom walls, said recessed portion having edge walls generally parallel to said side walls and a plurality of spaced finger means extending from at least one of said edge walls into said recessed portion toward the opposite edge wall for resiliently engaging an end of a splice positioned in said recessed portion.

13. A splice tray according to claim 12 wherein the bottom of said recessed area, between said edge walls of said recess, is provided with an opening affording access therethrough to a said splice positioned between said edge walls and retained by said resilient finger means for removing said splice from the resilient finger means.

14. A splice tray according to claim 13 wherein the resilient finger means are recessed below the bottom wall, and the bottom of the recessed portion receives a said splice, which is retained against said bottom by said resilient finger means gripping the splice at the end thereof, whereby the optical fibers joined in the splice substantially rest on the bottom wall adjacent the edge walls of the recessed portion to restrict bending of the fibers.

15. A method of handling and storing spliced ends of optical fibers between a pair of buffer tubes, each of said buffer tubes encasing a plurality of optical fibers, comprising the steps of:

stripping a length of the buffer tube from the plurality of optical fibers;

placing the end of the buffer tube in one end of a tray and snapping the same in place to retain the free end of the buffer tube in the casing;

extending the optical fibers along the side and end walls of the tray to wrap approximately one to two wraps of slack fiber of each optical fiber within the tray;

directing the optical fibers past the midpoint of one side wall of the tray;

cutting the fibers from the buffer tube at a predetermined point to make the exposed optical fibers the same length;

placing an end of each fiber in a splice; and placing the splices in side-by-side position along the length of the tray, whereby the loops of the fibers will be spaced progressively at different distances from one end wall of the tray.

16. The method of claim 15 further comprising the steps of:

placing a second buffer tube in the casing;

stripping a length of the second buffer tube to expose the individual optical fibers;

wrapping the optical fibers about the inside walls of the tray making one or two wraps and terminating along the other side wall of the tray and cutting the optical fibers to the same length; and placing the ends of the optical fibers into the other end of a splice receiving one end of a fiber from the first buffer tube whereby, when the splices are positioned in the tray, the loops of the fibers will be spaced progressively at different distances from the other end wall of the tray.

17. The method according to claim 16 further including the step of snapping the splices into channels sufficiently for resilient retainers to engage opposite ends of the splices to hold the same in side-by-side relationship in the tray.

* * * * *